O. A. ARNET.
AUTOMOBILE SLED.
APPLICATION FILED MAR. 23, 1910.

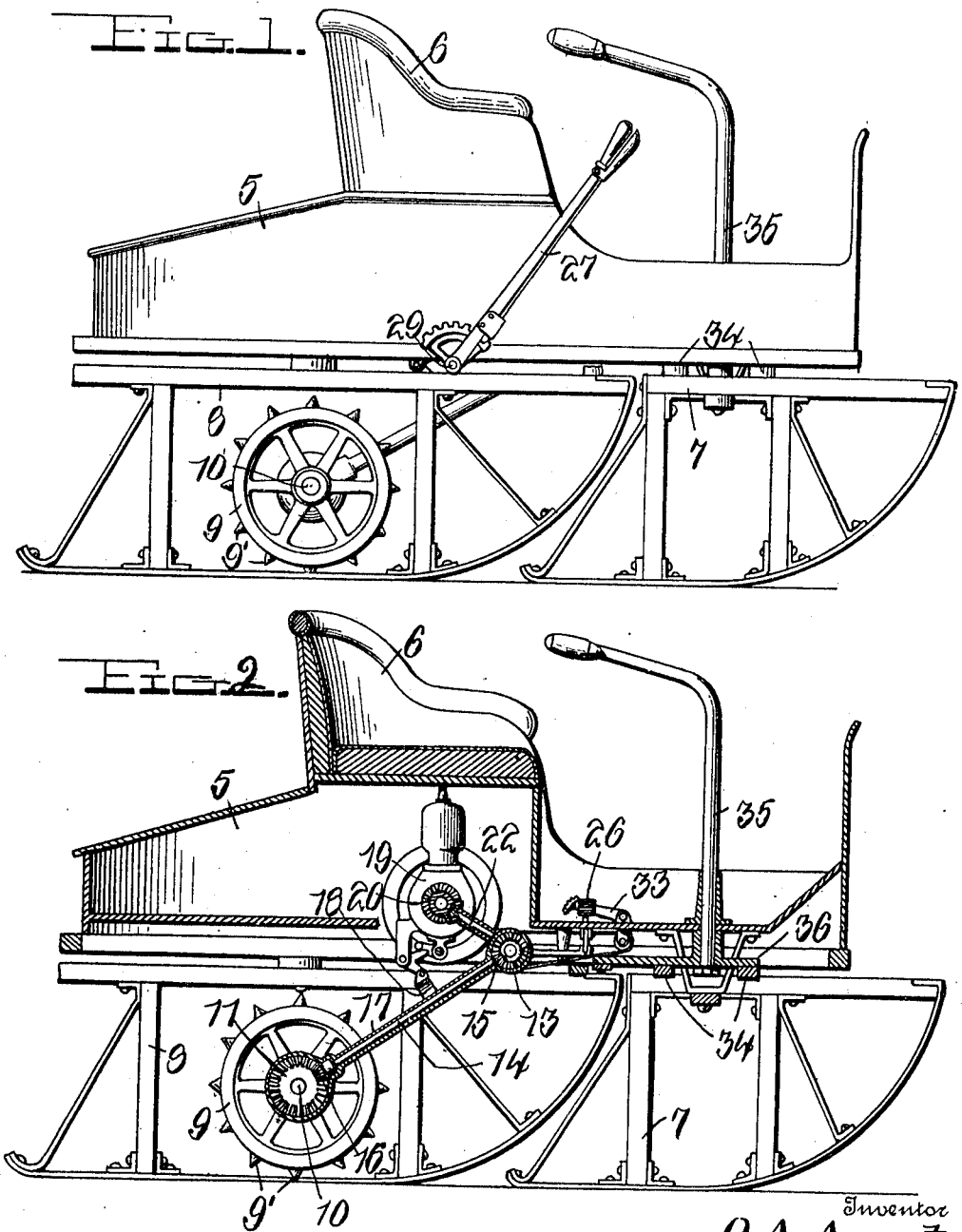

970,008.

Patented Sept. 13, 1910.
2 SHEETS—SHEET 2.

Witnesses
Chas. L. Griesbauer.
E. M. Ricketts

Inventor
O. A. Arnet,
By Watson E. Coleman,
Attorney

UNITED STATES PATENT OFFICE.

ORLA A. ARNET, OF WOODLAND, MICHIGAN.

AUTOMOBILE SLED.

970,008. Specification of Letters Patent. Patented Sept. 13, 1910.

Application filed March 23, 1910. Serial No. 551,070.

*To all whom it may concern:*

Be it known that I, ORLA A. ARNET, a citizen of the United States, residing at Woodland, in the county of Barry and State of Michigan, have invented certain new and useful Improvements in Automobile Sleds, of which the following is a specification, reference being had to the accompanying drawings.

This invention relates to certain new and useful improvements in automobile sleighs and has for its object to simplify and improve the construction of machines of this character whereby they may be operated with ease and comfort to the occupants of the sleigh.

Another object is to provide new and novel driving means, and an efficient brake mechanism whereby the speed of the vehicle may be regulated.

A still further object is to provide means for lifting the rear runners of the sleigh when the machine is being driven over places free from snow or ice.

Figure 3:
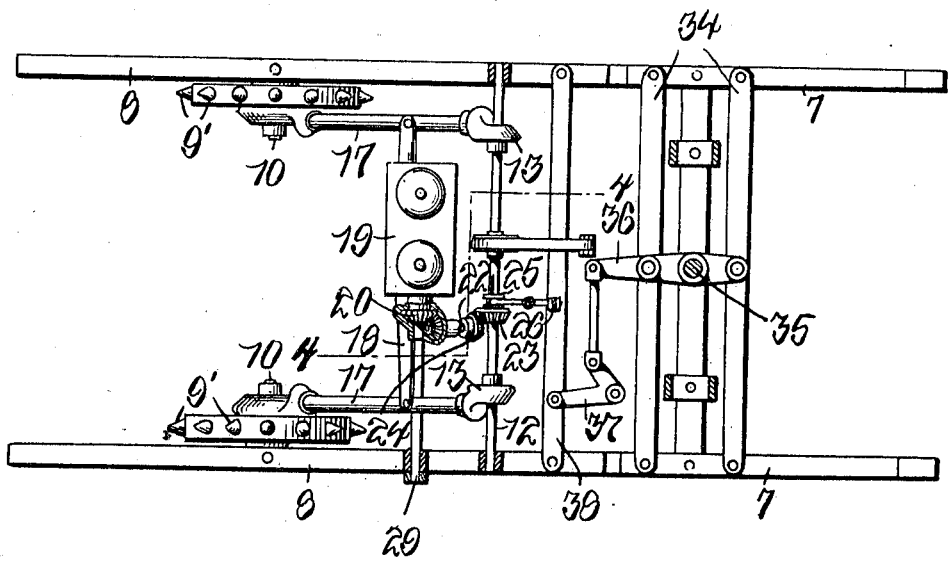
Figure 4:
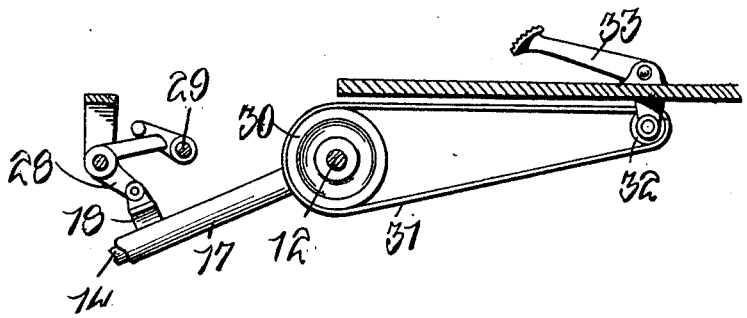

With these and other objects in view, the invention consists of the novel construction combination and arrangement of parts, hereinafter fully described and claimed and illustrated in the accompanying drawings, in which, Figure 1 is a side elevation of an automobile sleigh embodying my improvements; Fig. 2 is a vertical longitudinal section thereof; Fig. 3 is a top plan view, the body of the sleigh being removed; and Fig. 4 is an enlarged detail section taken on the line 4—4 of Fig. 3.

Referring more particularly to the drawings 5 indicates the sleigh body. and 6 the operator's seat. This sleigh body may be of any ordinary or approved construction and may be provided with any desired number of passenger seats. This body is mounted upon front and rear runners 7 and 8, respectively. The body of the machine is so mounted upon these runners that the runners may be readily turned beneath the same. The machine is driven through the medium of the driving wheels 9, which are disposed at opposite sides of the machine and beneath the rear portion of the body thereof. These driving wheels are provided with the short stub shafts 10, keyed or otherwise rigidly secured therein said shafts carrying the beveled pinions 11. A shaft 12 is transversely mounted beneath the body of the machine and upon each end thereof a driving pinion 13 is secured. A drive shaft 14 extends between the transverse shaft 12 and the drive wheels and is provided upon its ends with the beveled pinions 15 and 16, respectively, the pinion 15 meshing with the pinion 13, on the end of the shaft 12, and the pinion 16, having engagement with the teeth of the pinion 11 carried by the drive wheel 9. These driving connections are the same for each of the drive wheels, and the shafts 14 and the intermeshing pinions are incased in a tubular hanger rod 17. These tubular rods 17, are provided with enlarged housings upon their ends which receive the driving pinions, the upper end of each of said tubular rods bearing upon the transversely disposed shaft 12. The tubular hanger rods 17, are connected by means of a transversely disposed spring bar 18, said bar having its ends secured to these hanger rods and forcing the teeth 9' of the drive wheels into the snow or ice. These teeth are preferably of conical form to prevent the accumulation of snow or ice thereon and are provided with threaded shanks by means of which they are removably secured on the drive wheels.

An engine 19 is mounted on the body of the vehicle preferably beneath the driver's seat. The engine shaft carries a beveled gear 20 which engages with a pinion 21, secured upon the end of a shaft 22. This shaft extends forwardly and transmits power to the transverse shaft 12, through the medium of a gear 23 secured on said shaft and a pinion 24, carried by the shaft 22. The gear 23 is loosely arranged upon the shafts 12 and is adapted to be rigidly secured thereon to rotate said shaft through the medium of a sliding clutch 25 this clutch is operated by a pivoted foot operated lever 26 extending through the bed of the body 5. Thus it will be seen that when the engine is operated it is only necessary to lock the loosely mounted gear 23 upon the shaft 12, to cause the rotation of said shaft and through the medium of the co-engaging pinions, the operation of the driving shafts 14 and the drive wheels 9. As the peripheral teeth of these wheels engage with the snow or ice it will be obvious that the sleigh will be rapidly propelled over the ground. When places are encountered that are free of snow or ice, the rear body portion of the machine and the sleigh runners are adapted to be lifted, the weight of the same being supported by the driving wheels. This is accomplished through the medium of a lever 27, mounted upon one side of the vehicle body, said lever being adapted to oscillate a bell crank 28, which is connected to the inner end of a transverse rod or shaft 29, the outer end of said shaft being rigidly secured to the lever and adapted to be rotated thereby. One of the arms of the bell crank 28 is centrally secured to the transverse connecting spring bar 18, which connects the tubular rods or casings of the driving shafts 14.

A band wheel 30 is carried by the shaft 12 and a brake band 31 of suitable friction material is disposed thereon, said band also extending around a roller or pulley 32 secured upon the lower end of a pivoted lever 33. This lever is adapted to be engaged and operated by the foot of the driver and increases or decreases the friction of the endless band upon the wheel 30, thus regulating the speed at which the sleigh is propelled.

Any preferred steering mechanism may be employed but for convenience I preferably employ the following mechanism: The front runners 7 are connected by the parallel transverse bars 34. A steering rod 35 extends centrally through the bed of the body 5 and has secured upon its lower end a plate 36, the front and rear ends of which are pivotally connected to the transverse bars 34. This plate extends rearwardly of the bars 34 and is connected to one end of a bell crank 37, the other end of which is pivotally secured to a transverse connecting bar 38 extending between the rear runners 8. The bars 34 and 38 are each pivotally connected to the runners 7 and 8 and it will be obvious that when the steering rod 35 is turned by the operator the front and rear runners will be simultaneously turned at an angle to the body so that the entire machine may be easily and quickly guided or steered around curves.

From the foregoing, it is believed that the construction and operation of my improved sleigh will be readily understood. The construction of the machine is simple, and the driving mechanism is so arranged that the wheels 9 are positively operated at all times, the spring bar 18 compensating for unevenness in the ground surface and preventing undue shock or vibration to the vehicle body. The driving shafts and pinions are thoroughly protected by means of the casings so that snow and ice cannot enter the same and interfere with its proper operation. These tubular casings and the transverse connecting bar 18 between the same provide an oscillatory hanger frame for the drive wheels, supporting said wheels at all times in contact with the ground surface and permitting of their relative vertical movement without interfering with the continued operation of the remaining driving mechanism.

While I have shown and described the preferred form of my invention it will be understood that the same is susceptible of many minor modifications without departing from the essential features or sacrificing any of the advantages thereof.

Having thus described the invention, what is claimed as new is:—

1. In a machine of the character described the combination with a body and runners supporting same, a transverse shaft mounted beneath said body, an engine carried by the body, driven connections between the engine shaft and the transverse shaft to rotate the latter, tubular hanger rods mounted on said transverse shaft adjacent to its ends, a transversely disposed spring bar connecting said hanger rods, drive wheels rotatably mounted in the rear ends of said bars, driven connections between the transverse shaft and said driving wheels whereby said wheels are rotated, means slidable on the shaft for disconnecting the same from the driven connections to the engine, a bell crank secured at one end to the spring bar connecting the hanger rods, and manually actuated means engaging the other end of the bell crank to raise the body and support the same on the hanger rods.

2. In a machine of the character described the combination with a body and runners for supporting the same, of a transverse shaft mounted beneath the body, an engine carried by said body, a connecting shaft between the engine shaft and said transverse shaft to rotate the latter, a tubular hanger rod mounted on each end of the transverse shaft and extending rearwardly therefrom, a transversely disposed spring bar connecting said hanger rods, drive wheels rotatably mounted in the rear ends of said rods, drive shafts rotatably mounted in the tubular hanger rods, a pinion on each end of the transverse shaft, a pinion carried by each of the drive wheels, and co-engaging pinions on the ends of the drive shafts engaging with the pinions on the transverse shafts and the drive wheels.

In testimony whereof I hereunto affix my signature in the presence of two witnesses.

ORLA A. ARNET.

Witnesses:
C. S. PALMERTER,
J. S. REISINGER.